Aug. 6, 1963 T. C. FLETCHER 3,100,282

SHIELDING AMPLIFIER CIRCUIT

Filed Oct. 29, 1958

INVENTOR
TAYLOR C. FLETCHER

BY HIS ATTORNEYS
HARRIS, KIECH, FOSTER & HARRIS

United States Patent Office 3,100,282 Patented Aug. 6, 1963

3,100,282

SHIELDING AMPLIFIER CIRCUIT

Taylor C. Fletcher, Fullerton, Calif., assignor to Beckman Instruments, Inc., a corporation of California Filed Oct. 29, 1958, Ser. No. 770,386
6 Claims. (Cl. 330—68)

This invention relates to shielding circuits for use in systems handling low level D.C. signals and, in particular, to shields and shield connections for use in systems wherein the electrical signals being handled are floating with respect to ground.

In measuring systems, it is often necessary to connect one or more remotely located transducers or signal sources to an output device, with the transducers producing small magnitude D.C. voltages in response to changes in some physical phenomenon, such as temperature, pressure, rate of flow, and the like. Ground potential will differ considerably from location to location and it is not possible to connect transducers producing low level signals to output devices through ground loops because variable and unknown voltages will be superimposed on the signal voltages of the transducers. Hence, the usual technique is to connect the transducer to the input side of the system by two leads, neither of which is grounded, twisting and shielding these leads to reduce the influence of electrostatic and electromagnetic fields. The transducer output leads are referenced to the ground potential that exists at the location of the transducer. Even where there is no direct connection from transducer ground through the transducer power supply to the signal leads, there may be considerable capacitance between the transducer and leads and the transducer ground. Consequently, there may be a considerable potential between a floating system and the system ground when the system is connected to a remote transducer. This potential produces a voltage on the system which is ordinarily referred to as "common mode voltage" and which is equally applied to both input leads.

The signal voltage must generally be amplified. After amplification, the signal may be used to operate a voltmeter or other readout system which need not necessarily be referenced to an instrument or system having a grounded output terminal. Also, the amplified signal may be coupled to a grounded system by some type of floating-input grounded-output transfer device. A suitable device for this purpose is shown in the copending application of Karl Hinrichs and Jerome V. White, entitled "Method of and Apparatus for Transferring Analog Signal Voltages," Serial No. 763,864, filed September 29, 1958, and assigned to the same assignee as the present application.

The signal voltage amplification will be obtained by use of a potentiometrically connected feedback amplifier which provides an extremely high input impedance for the transducer and a relatively low output impedance for coupling to the readout or indication system. In such circuit, however, the amplifier and other circuit units are floating with respect to ground potential or are at a potential differing from the ground potential by the common mode voltage, and the capacitance between the units and ground results in generation of undesirable voltages in the system. Accordingly, it is an object of the invention to provide shields and circuits for connecting the shields for use in such systems to substantially eliminate undesired capacitances and, hence, undesired voltages on the signal leads. A further object is to provide such circuitry wherein the shield or shields are connected to the feedback loop of the amplifier at a transducer terminal or at a point having a low impedance to a transducer terminal.

Where an amplifier and the components associated therewith are located remote from the transducer which is the source of the signal to be amplified, there will be common mode current between the transducer and circuit ground via a capacitance to ground of the amplifier and associated components. This common mode current generates voltages that are not distinguishable from the signal voltages of the transducer. It is an object of the invention to provide a shielding circuit which will prevent deleterious effects due to occurrence of common mode voltages in a measuring system which includes a remote transducer and a potentiometrically connected feedback amplifier.

Common mode current will exist in systems where there is an impedance path to each of different grounds with a potential difference existing between the various grounds. It is an additional object of the invention to provide a shielding circuit which controls this common mode current such that no appreciable errors result.

It is an object of the invention to provide a floating potentiometric type feedback amplifier with means for connecting a signal source into the feedback loop, and a shield around the amplifier with the shield connected to the feedback loop at a signal source terminal or at a point having a low impedance to a signal source terminal. A further object of the invention is to provide such a circuit including a low pass filter connected ahead of the amplifier for attenuating A.C. voltages in the transducer signal. Another object of the invention is to provide such a circuit including a low pass filter connected across the output of the amplifier for attenuating A.C. voltages in the output. It is an object of the invention to provide such a circuit wherein the amplifier and the input and/or output filter are enclosed in a single shield or in separate shields with the shields connected to a signal source terminal. A still further object of the invention is to provide such a circuit wherein a second shield may be positioned around the first shield with the second shield connected to circuit ground.

Other objects, advantages, features and results of the invention will more fully appear in the course of the following description. The drawing merely shows and the description merely describes preferred embodiments of the present invention which are given by way of illustration or example.

Figure 1:
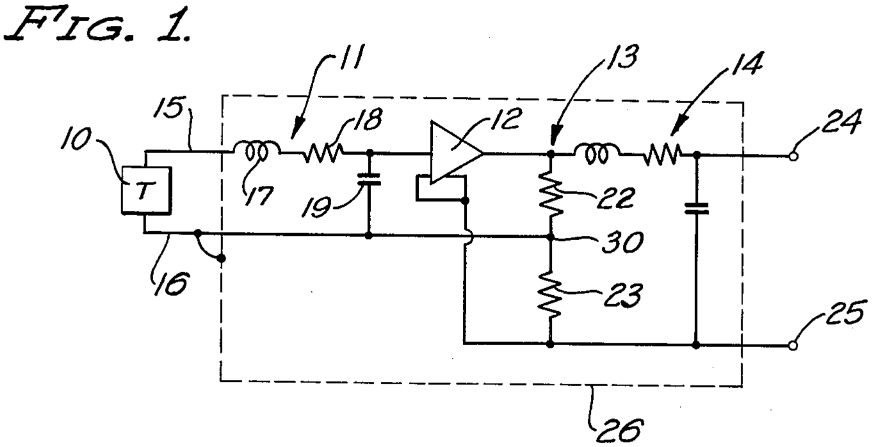
FIG. 1 is a schematic diagram of a preferred embodiment of the invention.

The circuit of FIG. 1 includes a transducer 10, an input filter 11, an amplifier 12, an output circuit 13 for the amplifier, and an output filter 14. The transducer 10 may be conventional in nature, such as a strain gage, a potentiometer, a thermocouple, a varistor, or the like, producing a signal voltage on a pair of leads 15, 16.

The input filter 11 functions as a low pass filter for attenuating A.C. voltages on the signal leads and is typically an L section having a series inductance 17 and resistance 118 and a shunt capacitance 19. The output filter 14 also is a low pass filter for attenuating A.C. voltages and may have the same form as the filter 11. It should be noted that while most practical applications of the invention will utilize such filters, they are not necessary to the shielding circuit of the invention and may be omitted under some circumstances. While it is true that in many applications A.C. common mode is the most obvious phenomenon, in which case the filters attenuate voltages generated across any system impedances by A.C. common mode current, there are cases where D.C. common mode is prevalent and consequently the filters are not as essential.

The amplifier 12 may be conventional in design having a negative gain that is very high so that the over-all gain of the circuit can be controlled by the relative values of resistors 22, 23 which comprise the output circuit 13. A feedback voltage is developed across the resistor 23, which resistor is ordinarily referred to as the feedback resistor. The feedback voltage is coupled to the input of the amplifier 12 via a feedback loop comprising the lead 16, the transducer 10 and the lead 15.

The amplified signal voltage appears at the terminals 24, 25. It should be noted that there are no direct connections to circuit ground in this circuit and the entire circuit is floating. A nongrounded output device may be directly connected to the terminals 24, 25 or some type of floating-input grounded-output transfer device as referred to above may be utilized.

A shield 26 is provided around the input filter 11, the amplifier 12, the output circuit 13 and the output filter 14 with the shield connected to the lead 16. The structural details of the shield itself are not a feature of the invention and any conventional type of shield, such as a closed conductive container or a mazed structure, may be used. While the circuit of FIG. 1 shows all of the components associated with the amplifier 12 enclosed within the shield, it should be kept in mind that it is only necessary to shield those components which have an appreciable capacitance to system or transducer ground.

The amplifier 12 is operated as a conventional potentiometric type feedback amplifier with the signal voltage from the transducer applied across the amplifier input and the feedback point 30 at the junction of the resistors 22, 23. Under equilibrium conditions, the circuit will develop a feedback voltage across the resistor 23 equal and opposite to the voltage of the transducer so that the input to the amplifier is substantially zero. Under these conditions there will be only an infinitesimally small current in the leads 15, 16 meaning that the apparent input impedance of the amplifier system is very high.

If we consider the sield 26 as removed from the circuit of FIG. 1, there will be capacitances to circuit ground from the amplifier as well as from the various components of the filters and the output circuit. There also may be some finite resistance from the amplifier to circuit ground through the power supply therefor. The transducer 10 is physically located at a distance from the amplifier and there will ordinarily be a voltage difference between the ground potential at the location of the transducer and the ground potential at the location of the amplifier. This ground potential difference will produce a current in a closed current loop comprising the transducer, the transducer to amplifier leads, the amplifier system, the capacitance to circuit ground of the amplifier system, the ground conductive path from circuit ground to the transducer ground, and back to the transducer itself. This is a common mode current which produces a voltage indistinguishable from the signal.

However, when the shield 26 is positioned and connected according to the invention, the adverse effects of such common mode currents on the accuracy of the system are eliminated. The shield 26 is positioned around all circuit elements of the system which have a significant impedance to ground, i.e., those which would provide a current path to ground for the current loop described in the preceding paragraph. According to the invention, the shield is connected to a point on the feedback loop which has a relatively low impedance to the transducer where the common mode voltage is injected by the common current. In the circuit of FIG. 1, this could be the lead 16 which provides a conductive connection between the feedback point 30 and one terminal of the transducer, which connection has substantially zero impedance. With the shield connected to the terminal of the transducer, the only current which exists due to the common mode voltage is in the impedance between the shield and the transducer itself. Hence, the impedance between the shield and a transducer terminal is kept low so that error resulting from such current is negligible. Whereas the shield prevents A.C. common mode current through system impedance, in case of D.C., common mode leakage of D.C. current from the floating system to circuit ground is also prevented. D.C. leakage occurs between the shield and ground and not between the floating system and ground and therefore harmful effects of both D.C. and A.C. common mode voltages are prevented in the same way.

The shielding circuit of the invention is far superior to the conventional shielding circuit wherein the shield is connected to circuit ground. The conventional shielding connection will protect the amplifier system from external disturbances but does not eliminate the effects of the common mode current loop which includes the impedances between the amplifier and associated components and the grounded shield. Error voltages are generated which depend in a complicated manner upon the magnitude of the impedances and the signal and supply voltages involved. Also, A.C. voltages may be generated between points where they are not attenuated by either input or output filters.

Another type of circuitry which has been tried for the control of common mode currents is the connection of the shield or shields to the amplifier ground, i.e., to the terminal 25 of the circuit of FIG. 1. However, this results in a common mode current through the feedback resistor 23, the A.C. component of which generates an A.C. voltage in the system which is not attenuated by the filter 11 and which is not distinguishable from the signal voltage.

Figure 2:
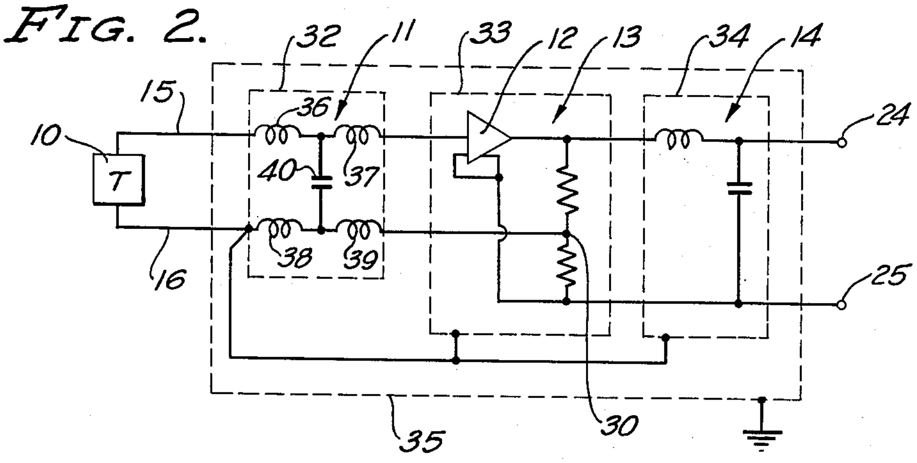
FIG. 2 is a schematic diagram showing several alternatives for the embodiment of FIG. 1.

FIG. 2 shows another form of the shielding circuit of the invention including a number of alternative embodiments, any of which may be introduced into the circuit of FIG. 1 if desired. Identical elements in the circuits of FIGS. 1 and 2 are identified by the same reference numerals.

It is not necessary that all of the components of the amplifier system to be shielded be positioned within a single shield. As illustrated in FIG. 2, the input filter 11 is enclosed in a shield 32, the amplifier 12 and output circuit 13 are enclosed in a shield 33 and the output filter 14 is enclosed in a shield 34. However, as in the circuit of FIG. 1, all three shields are connected to the lead 16 of the transducer 10.

In certain applications of the invention, it is desirable to provide a second shield 35 around the shield or shields connected to the feedback loop, with the second shield connected to circuit ground. Where in the vicinity of the amplifier system there are strong electrical fields due to external sources, the grounded outer shield 35 serves to substantially eliminate the effects of these fields on the signal voltages of the circuit.

While it is seen that the shield 26 of FIG. 1 is directly connected to the feedback point 30 of the amplifier circuit via the lead 16, this is not always the case since the feedback point does not always have a low impedance to a terminal of the transducer. For example, in the circuit of FIG. 2, the input filter 11 is an H type filter having series connected inductances 36, 37 in the lead 15, series connected inductances 38, 39 in the lead 16 and a shunt capacitance 40, resulting in a relatively high impedance between the feedback point 30 and a terminal of the transducer 10. Hence, in the circuit of FIG. 2, the shields 32, 33 and 34 must be connected to the input side of the input filter rather than to the output side.

While the invention has been described herein in connection with filters ahead of and following the amplifier, it is clear that the shielding circuit of the invention can be used with other circuit units. In deciding which components of a system should be shielded with a shield connected to the transducer terminal, the magnitude of the impedance between the component and ground is the primary criterion since the common mode current will be a function of this impedance. Components having very low capacitance and, hence, high impedance to ground may not be shielded, whereas components, such as an amplifier having lower impedance to ground, will almost always be so shielded.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a floating system for measuring direct current voltages, the combination of: an ungrounded transducer having signal leads; said transducer producing input signals; a feedback amplifier having an input and an output; a filter network connected to the input of said feedback amplifier for attenuating A.C. input signals; a voltage dividing network connected to the output of said feedback amplifier for producing a feedback signal; means connecting said transducer to said filter and to said voltage dividing network for providing a feedback loop, whereby the feedback signal and transducer signal are combined to form error voltages; an ungrounded shielding means for shielding said amplifier from the influence of external electrostatic and electromagnetic fields; and a lead electrically connecting said shielding means to one of the signal leads of said transducer.

2. In combination: a floating feedback amplifier having an input and an output; a voltage dividing network connected across the output of said amplifier, said network comprising an output resistor and a feedback resistor; a transducer; signal lead means connected to said transducer, said feedback resistor and the input of said feedback amplifier for providing a feedback loop comprising a series connection of said transducer, said feedback resistor and the input of said amplifier; a low pass filter network connected between said transducer and the input of said amplifier; and a shield at least partially enclosing said amplifier and associated parts including said feedback resistor, with said shield electrically connected to one of said signal lead means in said feedback loop.

3. In a floating amplification circuit, the combination of: a feedback amplifier; a two-terminal ungrounded transducer connected in series circuit in the feedback loop of said amplifier, said transducer being remote from said amplifier; an ungrounded shielding means for shielding said amplifier from the influence of external electrostatic and electromagnetic fields; and means for electrically connecting said shield to a point in the feedback loop of said amplifier that has low electrical impedance to one of the terminals of said transducer.

4. In combination: a feedback amplifier having an input and an output; an output circuit comprising an output resistor and a feedback resistor connected in series across the output of said amplifier; a low pass input filter connected to the input of said amplifier; signal leads connected to said input filter and adapted for connection to a transducer; an output filter for attenuating A.C. voltages connected across the output of said amplifier; and ungrounded shields respectively around said output filter and said feedback resistor with each of said shields connected to one of said signal leads.

5. In a shielding circuit, the combination of: a high gain amplifier having ungrounded input and output terminals; a pair of impedances connected in series at a junction across the output terminals of said amplifier; feedback loop means connected between said junction and an input terminal of said amplifier to form a potentiometric type feedback amplifier circuit, said loop means including a pair of source terminals for connecting a signal source in electrical series circuit in the feedback loop; and a shield around said amplifier and connected to one of said pair of source terminals.

6. In a shielding circuit, the combination of: a high gain amplifier having ungrounded input and output terminals; a pair of impedances connected in series at a junction across the output terminals of said amplifier; feedback loop means connected between said junction and an input terminal of said amplifier to form a potentiometric type feedback amplifier circuit, said feedback loop means including a pair of source terminals for connecting a signal source in electrical series circuit in said feedback loop means; a first shield around said amplifier and connected to one of said pair of source terminals; and a second grounded shield around said first shield.

References Cited in the file of this patent

UNITED STATES PATENTS

| | | |
|---|---|---|
| 1,875,132 | Peterson | Aug. 30, 1932 |
| 2,111,397 | Holmes | Mar. 15, 1938 |
| 2,210,956 | Skillman | Aug. 13, 1940 |
| 2,724,022 | Williams et al. | Nov. 15, 1955 |
| 2,846,586 | Jernakoff | Aug. 5, 1958 |
| 2,862,046 | Relis | Nov. 25, 1958 |